(12) United States Patent
Crowe (10) Patent No.: US 6,508,028 B1
(45) Date of Patent: Jan. 21, 2003

(54) GAME DECOY WITH HIGH-SPEED, ROTATING "STROBE" WINGS AND IN-LINE MOTOR DRIVE

(76) Inventor: Claude M. Crowe, 2984 New Monroe Rd., Bastrop, LA (US) 71220

( * ) Notice: Subject to any disclaimer, the term of this patent is extended or adjusted under 35 U.S.C. 154(b) by 0 days.

(21) Appl. No.: 09/491,247

(22) Filed: Jan. 26, 2000

(51) Int. Cl.[7] ............................................. A01M 31/06
(52) U.S. Cl. ............................................................. 43/3
(58) Field of Search ....................... 43/2, 3, 26.1, 26.2

(56) References Cited

U.S. PATENT DOCUMENTS

| | | | | |
|---|---|---|---|---|
| 955,203 | A | * 4/1910 | Reynolds | 43/3 |
| 2,443,040 | A | * 6/1948 | Jones | 43/3 |
| 2,480,390 | A | * 8/1949 | Thompson | 43/3 |
| 2,575,252 | A | * 11/1951 | Berger | 43/3 |
| 2,704,416 | A | * 3/1955 | Laird | 43/3 |
| 2,747,314 | A | * 5/1956 | McGregor | 43/3 |
| 2,799,960 | A | * 7/1957 | Riley | 43/3 |

(List continued on next page.)

OTHER PUBLICATIONS

Mack's Prairie Wings Catalog, p. 11 the "Fatal De Ducktion" decoy.*
Timothy's Catalog, p. 5 the "Fatal De Ducktion" decoy.*
Herter's Catalog, p. 62.*
Hawks 2000 Catalog, p. 39 the "Fatal De Ducktion" decoy.*
Arkansas Democrat Gazette newspaper, "Mechanical decoys have duck hunters going wild", Steve Bowman, Dec. 23, 1999.*
Herter's Catalog, p. 33.*
Cabela's p. 377.*
S.W. Early Waterfowl Supply Co. Catalog, p. 26.*
Steve Bowman's, "Mechanical decoys have duck hunters going wild", Dec. 23, 1999, Arkansas Democrat Gazette on inter alia the "Fatal De Ducktion" decoy.*
Herter's catalog. Burnsville, NC, p. 33.*
Cabela's Master Fall 1999 Catalog. Sidney, NK, p. 377.*
S.W. Earley Waterfowl Supply Co catalog. Kinston, NC, p. 26.*
Mack's Prairie Wings catalog. Stuttgart, AR, p. 11 on inter alia the "Fatal De Ducktion" decoy.*
Timothy's catalog. Little Rock, AR, p. 5 on inter alia the "Fatal De Ducktion" decoy.*
Herter's catalog. 99#643. Greenville, NC, p. 62.*
Hawks 2000 catalog. Blytheville, AR, p. 39 on inter alia the "Fatal De Ducktion" decoy.*

*Primary Examiner*—Darren W. Ark
(74) *Attorney, Agent, or Firm*—Kean, Miller, Hawthorne, D'Armond, McCowan & Jarmon, L.L.P.; William R. Coenen, III; Russel O. Primeaux (57) ABSTRACT

A water fowl (e.g. duck) decoy system in which the decoy's wings (20/120), which are flat and both longitudinally and laterally extended by, for example, having one or more, curved lobes (23/123A&B, note FIGS. 1& 5B), producing a disc like shape, preferably of a size of at least about nine (9") inches in "diameter," with contrasting colors (e.g., dark olive & white; cf. FIGS. 5B & 5C) on its flat sides with one or more stripes on its lighter side, are rotated at a relatively high speed (e.g., ~600 rpm+, e.g., more particularly ~600 or ~750 rpm or up to ~900 rpm or greater), producing a "strobe" like effect for enhanced visibility of the decoy to flying ducks. Additionally, the decoy (1/101) has a laterally disposed, direct, in-line, DC electric motor drive (30), with laterally directed, dual shaft connectors (note FIG. 3) directly connected to the wings. The wings may be connected to the dual motor shafts with their respective center-lines (29) either co-incidental or at varying angles (note set of proximal connector holes 27A–C of FIG. 3), producing a variable, wing "flapping" like effect when angled, i.e., not-co-incident.

27 Claims, 6 Drawing Sheets

U.S. PATENT DOCUMENTS

| | | | | |
|---|---|---|---|---|
| 2,814,146 A | * | 11/1957 | Propp | 43/3 |
| 2,835,064 A | * | 5/1958 | Webb | 43/3 |
| 2,849,823 A | * | 9/1958 | Miller | 43/3 |
| 3,000,128 A | * | 9/1961 | McAda | 43/3 |
| 3,800,457 A | * | 4/1974 | Barrett | 43/3 |
| 4,896,448 A | * | 1/1990 | Jackson | 43/3 |
| 5,231,780 A | * | 8/1993 | Gazalski | 43/3 |
| 5,289,654 A | * | 3/1994 | Denny et al. | 43/3 |
| 5,459,958 A | * | 10/1995 | Reinke | 43/2 |
| 5,515,637 A | * | 5/1996 | Johnson | 43/2 |
| 5,613,317 A | * | 3/1997 | Ninegar | 43/3 |
| 5,636,466 A | * | 6/1997 | Davis | 43/3 |
| 5,809,683 A | * | 9/1998 | Solomon | 43/3 |
| 5,862,619 A | * | 1/1999 | Stancil | 43/3 |
| 5,884,427 A | * | 3/1999 | Lenz | 43/2 |
| 5,926,990 A | * | 7/1999 | Okimoto | 43/2 |
| 5,930,936 A | * | 8/1999 | Parr et al. | 43/3 |
| 6,092,323 A | * | 7/2000 | McBride et al. | 43/3 |
| 6,170,188 B1 | * | 1/2001 | Mathews | 43/3 |
| 6,321,480 B1 | * | 11/2001 | Solomon | 43/3 |
| 6,339,893 B1 | * | 1/2002 | Solomon | 43/3 |
| 6,339,894 B1 | * | 1/2002 | Solomon | 43/3 |
| 6,408,559 B2 | * | 6/2002 | Mathews | 43/3 |

* cited by examiner

Figure 6:
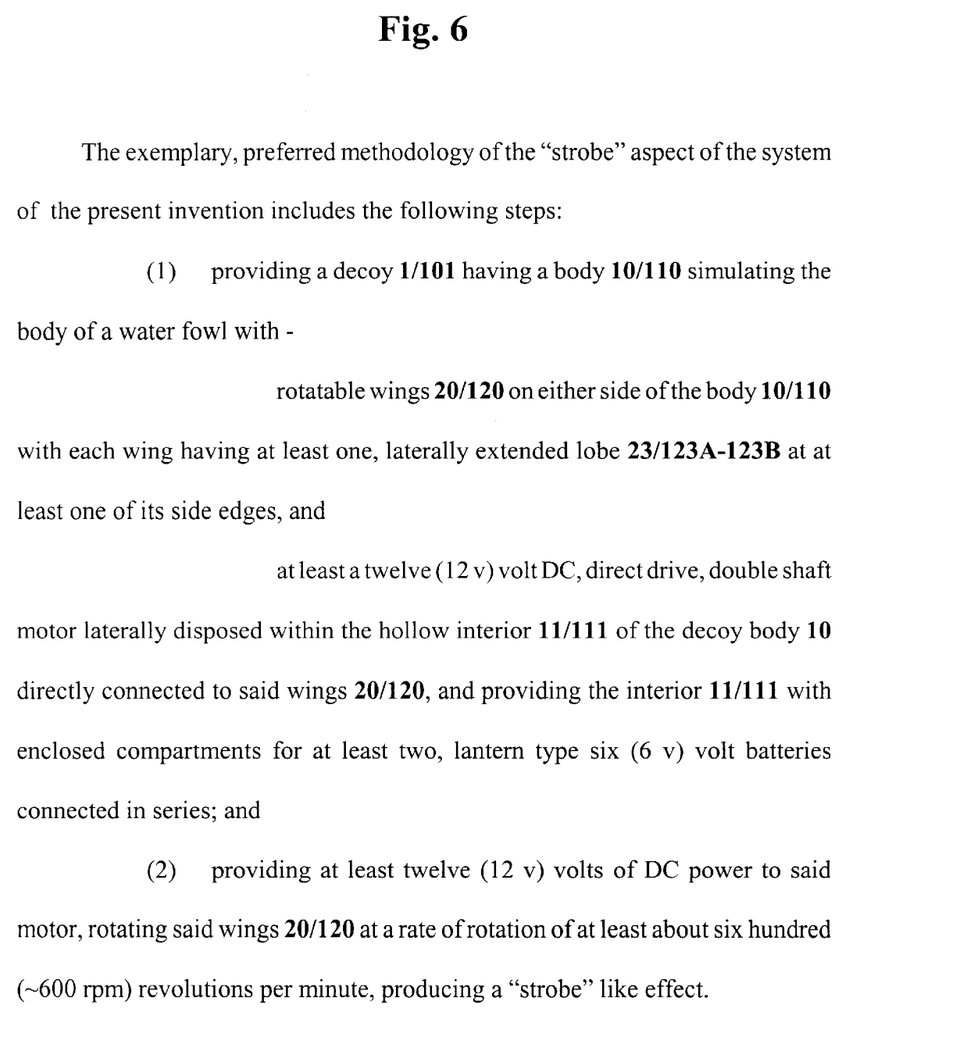
FIG. 6 is a flow chart summarizing the exemplary, preferred methodology of the "strobe" aspect of the system of the present invention.

The exemplary, preferred methodology of the "strobe" aspect of the system of the present invention includes the following steps:

(1) providing a decoy 1/101 having a body 10/110 simulating the body of a water fowl with - rotatable wings 20/120 on either side of the body 10/110 with each wing having at least one, laterally extended lobe 23/123A-123B at at least one of its side edges, and at least a twelve (12 v) volt DC, direct drive, double shaft motor laterally disposed within the hollow interior 11/111 of the decoy body 10 directly connected to said wings 20/120, and providing the interior 11/111 with enclosed compartments for at least two, lantern type six (6 v) volt batteries connected in series; and (2) providing at least twelve (12 v) volts of DC power to said motor, rotating said wings 20/120 at a rate of rotation of at least about six hundred (~600 rpm) revolutions per minute, producing a "strobe" like effect.

GAME DECOY WITH HIGH-SPEED, ROTATING "STROBE" WINGS AND IN-LINE MOTOR DRIVE

TECHNICAL FIELD

The present invention relates to a water fowl decoy system, using a decoy body emulating, for example, a mallard duck, in which the decoy's wings, which are flat and both longitudinally and laterally extended with contrasting color on its flat sides, are rotated at a relatively high speed (e.g. at least about 600 rpm) producing a "strobe" like effect for enhanced visibility of the decoy to flying water fowl (e.g. ducks). Additionally, the decoy has a direct, in-line, laterally disposed, electric motor drive, with laterally directed, dual shaft connectors for rotating the wings, and the wings may be connected to the motor shaft at varying angles producing a variable, wing "flapping" like effect.

BACKGROUND ART

The number of ducks and the interest in duck hunting are at an all time high. The acknowledged "weak link" in duck hunting is the decoys. Traditional decoys are simple plastic, duck shaped bodies used to attract live ducks. The problem with these floating, but otherwise static, decoys is that they show no evidence of individual movement, and live ducks soon become "decoy wise".

To attempt to solve this problem, hunters have been attempting to add various types of motion to their decoys over a long period of time. Currently, there are quite a few decoys being manufactured which provide a variety of motion including (1) vibrations which cause ripples on the water; (2) some movement in the water caused by small water pumps, motors, etc., causing some propulsion of the decoy over the water; (3) flapping or rotating wings; or (4) some combination of the foregoing.

| Pat. No.  | Inventor(s) | Issue Date     |
|-----------|-------------|----------------|
| 2,443,040 | Jones       | June 8, 1948   |
| 2,480,390 | Thompson    | Aug. 30, 1949  |
| 2,704,416 | Laird       | Mar. 22, 1955  |
| 2,747,314 | McGregor    | May 29, 1956   |
| 2,799,960 | Riley       | July 23, 1957  |
| 2,814,146 | Propp       | Nov. 26, 1957  |
| 2,835,064 | Webb        | May 20, 1958   |
| 2,849,823 | Miller      | Sep. 2, 1958   |
| 3,000,128 | McAda       | Sep. 19, 1961  |
| 3,800,457 | Barrett     | Apr. 2, 1974   |
| 4,896,448 | Jackson     | Jan. 30, 1990  |
| 5,231,780 | Gazalski    | Aug. 3, 1993   |
| 5,289,654 | Denny et al | Mar. 1, 1994   |
| 5,459,958 | Reinke      | Oct. 24, 1995  |
| 5,516,637 | Johnson     | May 14, 1996   |
| 5,613,317 | Ninegar     | Mar. 25, 1997  |
| 5,636,466 | Davis       | June 10, 1997  |
| 5,809,683 | Solomon     | Sep. 22, 1998  |
| 5,884,427 | Lenz        | Mar. 23, 1999  |
| 5,926,990 | Okimoto     | July 27, 1999  |
| 5,930,936 | Parr et al  | Aug. 3, 1999   |

As shown from the foregoing patents, the broad concept of electrically powered decoys goes back a long way, although most of such decoys drove a propeller or other part of the decoy other than rotating or oscillating the wings of the decoy; note, for example, the '040 (filed in 1944, over a half century ago), '390 (wing flapper), '416, '314 (wind-up wing flapper), '960, '146, '065, '823 (wing flapper), '128, '448 (wing flapper), '780 (user powered, wing flapper), '654 (radio actuated neck mover), '958 (moveable land based turkey), '631 (breeze animated, land based fowl), '317 (wind actuated, springy neck movement), '466 (radio actuated, wing flapper), '427 (deer tail flicking movement), '990 (body pivoted), and '936 (paddle splasher) patents.

Publications known to the inventor which may be of interest are:

*Mack'Prairie Wings* catalog (Stuttgart, AR), p. 11 on inter alia the "FATAL DE DUCKTION" decoy;

*Timothy's* catalog (Little Rock, Ark.), p. 5 on inter alia the "FATAL DE DUCKTION" decoy;

*Herter's* catalog (99-#643, Greenville, N.C.), p. 62;

*Hawks* 2000 catalog (Blytheville, Ark.), p. 39 on inter alia the "FATAL DE DUCKTION" decoy; and Steve Bowman's "Arkansas Sportsman" article from the Dec. 23, 1999 issue of the Arkansas Democrat Gazette newspaper on inter alia the "FATAL DE DUCKTION" decoy.

Note also, for general decoy product background information:

*Herter's* catalog (Burnsville, N.C.), p. 33;

*Cabela'*(Sidney, NK.), p. 377; and

*S.W. Earley Waterfowl Supply Co.* catalog (Kinston, N.C.), p. 26.

Perhaps the most pertinent prior art is the "FATAL DE DUCKTION" decoy which is described in inter alia the *Mack'Prairie Wings* catalog (p.11), the *Timoth's* catalog (p.5) and the *Hawks* 2000 catalog (p. 39) as having an over-all wing span of thirty-six (36") inches, with the wings being painted white on one side and brown (or drab olive) on the other, or, more generally, light on one side and dark on the other, that is, in contrasting colors. This decoy, like all of the other pertinent prior art patents, uses a relatively complex, mechanical drive including pulleys and small belts driven by a relatively small (1⅛"×1.5"), lower power, six (6 v) volt DC motor, to, in this case, rotate the decoy wings about a laterally extended axis (operational only under ideal type conditions). The "FATAL DE DUCKTION" decoy apparently has a wing rotational speed of about four hundred (400 rpm) revolutions per minute (note description in *Hawks* 2000 catalog, p. 39), producing, it is said, a "flashing motion mesmerizing any passing duck" or in another advertisement the rotating "wings offer the lifelike appearance of a duck landing into the decoys with wings fluttering," using four, relatively low power, "D" size, flashlight-type batteries [also note descriptions in *Timothy's* catalog, p. 5; and *Herter's* catalog (99-#643), p. 62], which provides only about an insufficient, six (6) hours of operation (requiring changing with often forgotten spare batteries after only a half day hunt), along with smaller area wings with "leading" flat edges, in contrast to the much higher rotational speed used in the invention (i.e., about 600 rpm or greater) with larger wings (about 50% larger), having laterally extending, curved lobes on at least their trailing edges, if not both leading and trailing edges, and a curved opposite edge, producing a disc like shape of preferably, of a size of at least about nine (9") inches in "diameter." These differences are not merely ones of degree but of kind, resulting in the present invention's "strobe" like effect, substantially adding to the attractive powers and high visibility of the decoy to flying ducks in comparison to the prior art.

Additionally, the "FATAL DE DUCKTION" decoy has much trouble with operating in less than ideal conditions, namely, in wind, rain, cold, etc., in contrast to the preferred embodiments of the present invention which operate well in any reasonable condition, including, wind, rain, cold, etc.

A patent which disclosed the oscillation (not rotation) of a decoy's wings is the Solomon patent (U.S. Pat. No. 5,809,683), which uses a relatively low powered, DC battery powered motor running off a single "D" type flashlight battery to drive a wing/foot combination at a flapping rate of 100–250 times per minute (column 1, lines 39–65), using a very complicated, motor drive interfacing mechanical mechanism (note FIGS. 4–6). It likewise has most of the deficiencies as that of the "FATAL DE DUCKTION" as well as some additional ones.

The system of the present invention solves all of the above noted problems of the prior art, some being long-standing, "great-need" problems.

GENERAL SUMMARY DISCUSSION OF INVENTION

As noted above, the present invention relates to a water fowl (e.g. duck) decoy system in which the decoy's wings are preferably flat and both longitudinally and laterally extended by, for example, having one or more leading and/or trailing edge, curved lobes, producing a laterally elongated circular area, similar to the shape of a disc, preferably of a size of at least about nine (9") inches in "diameter," with contrasting colors (e.g., drab olive or dark green & white) on its opposite, flat sides. The wings are rotated at a relatively high speed, e.g., at least about six hundred (~600 rpm+) revolutions per minute or more, producing in conjunction with the size, configuration and contrasting colors of the wings, a "strobe" like effect for enhanced visibility of the decoy to flying water fowl (e.g. ducks).

Additionally, the decoy has a laterally disposed, direct, in-line electric motor drive, with laterally directed, dual shaft connectors going directly to the wings for a simple, direct, in-line interconnection or direct drive. The centerlines of the wings effectively may be connected to the motor shaft at varying angles, producing a variable, wing "flapping" like effect as the wings are rotated.

Additionally, the electrical parts of the system, which are all housed in the interior of the decoy body, include a relatively powerful, DC electrical motor, powered by at least two, lantern type six (6 v) volt batteries in series [or a land-based, twelve (12 v) volt marine or car type battery], producing at least twelve (12 v) volts to the directly coupled or connected motor, providing strong (high torque), operational power for at least about a week or more.

BRIEF DESCRIPTION OF DRAWINGS

For a further understanding of the nature and objects of the present invention, reference should be had to both the foregoing discussions and the following description, taken in conjunction with the accompanying drawings, wherein:

FIG. 1 is plan view of a first, preferred, exemplary embodiment of the duck decoy of the present invention; while

FIG. 3 is a partial, cross-sectional or partially cut-away view of the embodiment of FIG. 1, showing inter alia the hollow interior of the body of the decoy and its laterally disposed, direct drive, double shaft, DC motor and dual battery storage area which drive the decoy wings at a relatively high, rotational speed, producing, in combination with the wing design and contrasting wing colors, the "strobe" like effect of the invention; while

FIGS. 5A, 5B & 5C are side-perspective, rear and front views, respectively, of a second, preferred, exemplary embodiment of the duck decoy of the present invention, with the two embodiments being substantially the same, but with this embodiment having an alternative, but currently less preferred, wing configuration design (cf. FIG. 4) and with the contrasting colors of both embodiments being seen in comparing FIGS. 5B & 5C.

EXEMPLARY MODES FOR CARRYING OUT THE INVENTION

Figure 1:
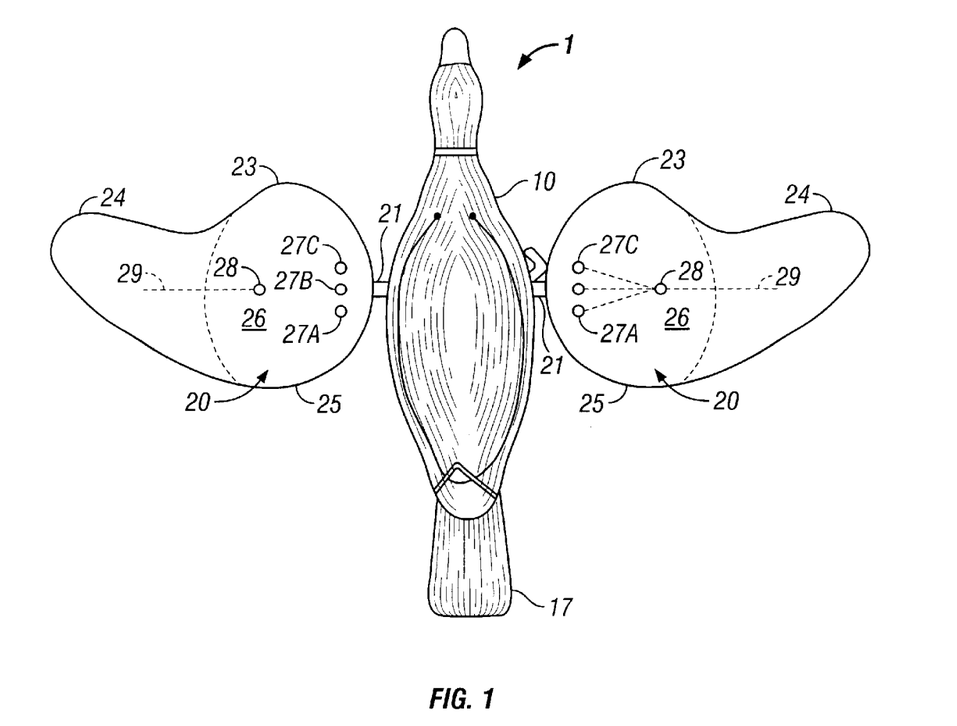
Figure 2:
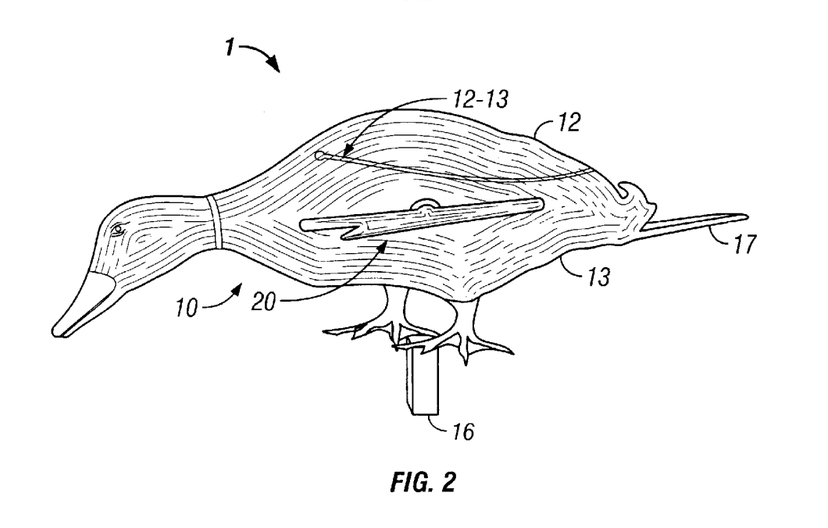
FIG. 2 is a side view of the embodiment of FIG. 1.
Figure 3:
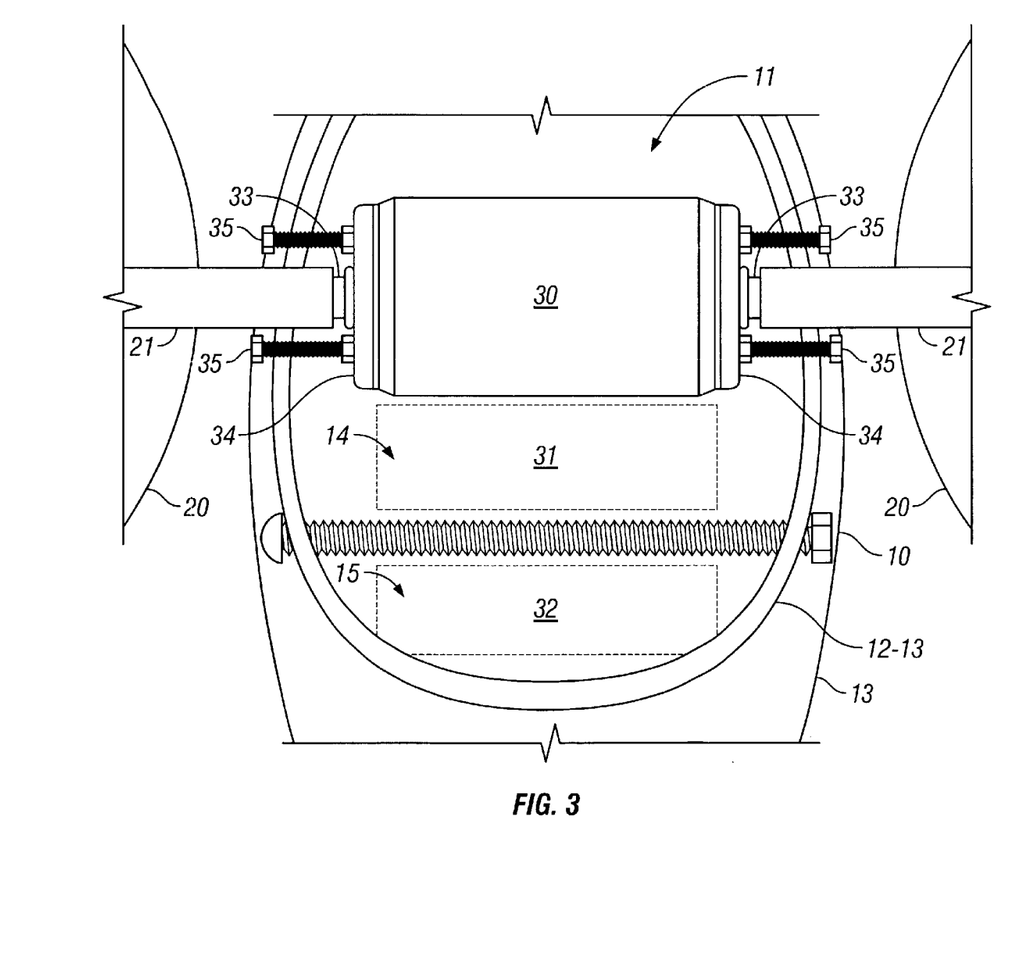
Figure 3A:
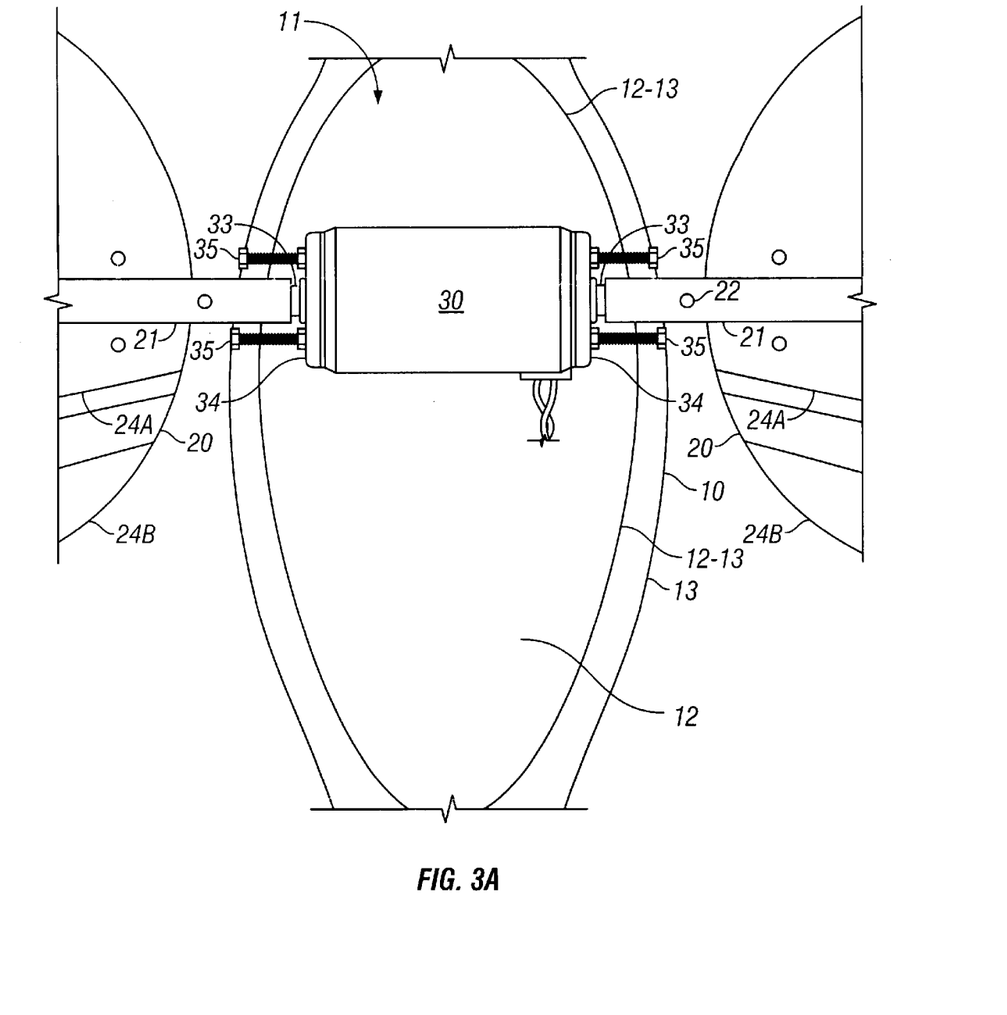
FIG. 3A is a similar view but showing other detail features of the embodiment of FIG. 1.

As can be seen in FIGS. 1–3, the first, currently preferred, exemplary embodiment of the water fowl decoy system of the present invention is based on, for example, a duck decoy 1 including a body 10 emulating the body of an actual duck (e.g., a mallard), two, substantively identical, rotatable wings 20 (shown with their "trailing" edges in the forward position), and a laterally disposed, in-line, DC motor 30 (note FIGS. 3 & 3A), directly connected or coupled to the wing shafts 21 by means of, for example, set screws 22 (note FIG. 3A).

The DC motor 30 preferably is a relatively substantial, heavier duty, double shaft, direct drive motor capable of handling a range of voltages from about, for example, twelve or less (e.g. down to about 6 v but preferably 12+volts) up to about, for example, ninety (12–90v) volts, preferably powered by a pair of lantern type, DC batteries 31 & 32 in series delivering at least twelve (12 v) volts. The motor 30 is included as a double shaft, direct drive motor mounted cross-wise, i.e. laterally disposed, in the hollow interior 11 of the decoy body 10, with each of the dual shafts 33 protruding outside of one side or the other of the decoy body to accept and be directly connected to the wing shafts 21 into which they fit, without any intermediate, relatively moveable, mechanical, interconnection means (e.g. pulleys, belts, cog wheels, moveable pins, etc.). This in-line, direct connection approach of the present invention avoids all of the complexities and problems of the complex, indirect, multi-tiered drives of the "rotating" or "oscillating" wing approaches of the decoy prior art.

The decoy body 10 thus has a hollow interior 11 formed between the top and bottom, body sections 12 & 13, respectively, produced by cut-line 12–13 (see FIG. 3), providing protection to the motor 30 and its associated batteries, while allowing easy access to the internal battery compartments 14 & 15, which contain the batteries 31 & 32, for easy removal and replacement of the batteries. An "on "/" off" switch (not illustrated) is provided preferably in the hollow body interior 11. The batteries 31 & 32 preferably are six (6 v.) volt, lantern type batteries connected in series, producing twelve (12 v) volts to the motor 30, causing the motor to rotate at about six hundred (600 rpm) revolutions[ ]per minute.

This particular voltage level also is desirable because many duck hunters with permanent hunting blinds furnish them with twelve (12 v) volt marine or car type batteries, and such a battery can be easily used as an alternative or supplemental DC power source using an adapter cord for the decoy 1. The two, series connected, six (6 v) volt lantern batteries 31 & 32 provide operational power for a week or more versus the approximately six (6) hours of operation of the closest prior art. Additionally, a blind's twelve (12 v) volt marine or car battery provides weeks of service without needing charging.

If so desired, a third, six (6 v) volt lantern battery (not illustrated) could be added in series, producing a total of eighteen (18 v) volts, causing the motor 30 to then rotate at about nine hundred (~900 rpm) revolutions per minute. The preferred range of rotational operation for the invention's "strobe" like effect measured in revolutions per minute (rpm) is at least about six (~600 rpm) hundred revolutions per minute and above, with a more limited range of about six to about nine hundred(~600—~900 rpm) revolutions per minute being preferred.

Again with reference to FIGS. 3 & 3A, the DC electric motor 30 has opposed ends 34, and there is further included a series of bolt fasteners 35 extending through the sides of the decoy body into the ends of the motor, suspending the electric motor within the chamber 11 from side to side. The bolt fasteners 35 preferably are the sole support for the motor 30 in the hollow chamber 11 of the decoy body 10.

As can be clearly seen in FIGS. 1, 3 and 3A and understood from the foregoing, each of the dual shafts 33 extends out and away from its respective motor end 34 to its distal end. The distal end of each dual shaft 33 is mechanically connected or coupled to its respective, separate wing shaft 21 by a separate mechanical interconnection (e.g., set screw 22) to facilitate common or coincident rotation of dual shafts 33 and wing shafts 21.

Likewise, as should be clearly understood from the foregoing and the figures, each wing 20 preferably has a terminating, distal wing tip 24 opposed to that on the other wing, with one wing 20 on one side of the body 10 and the other wing 20 located on the other side of the body 10. Wings 20 extend laterally out and away from the decoy body and are devoid of any supporting restraint at distal wing tips 24. To the contrary, each of the wings 20 are separately supported on a separate wing shaft 21. Each of wings 20 is laterally disposed with respect to the body 10 and longitudinally extended out with respect to itself. However, wing shafts 21 do not extend outwardly beyond the confines of wings 20, but remain within the confines of the wings 20, that is, effectively not extending past the distal tips 24 of the wings.

It likewise should be clearly understood from the figures and the foregoing description that the double shaft, direct drive, DC, electric motor 30 is located in and mounted on the decoy body 10 in its hollow interior chamber and has two, opposed ends 34 with a centrally located, drive end dual shafts 33 extending laterally out and away from either end 34. The proximal ends of each of wing shafts 21 are directly and separately coupled or interconnected via a mechanical device to the respective distal end of the dual shafts 33, thereby ensuring common or concurrent rotation. This common or concurrent rotation is accomplished with the wings 20 being solely supported by their respective wing shafts 21, which are, in turn, coupled to each of their respective dual shafts 33, the wings being devoid of any other connections to the body 10 and being solely supported by the motor 30 onto the body 10.

Figure 4:
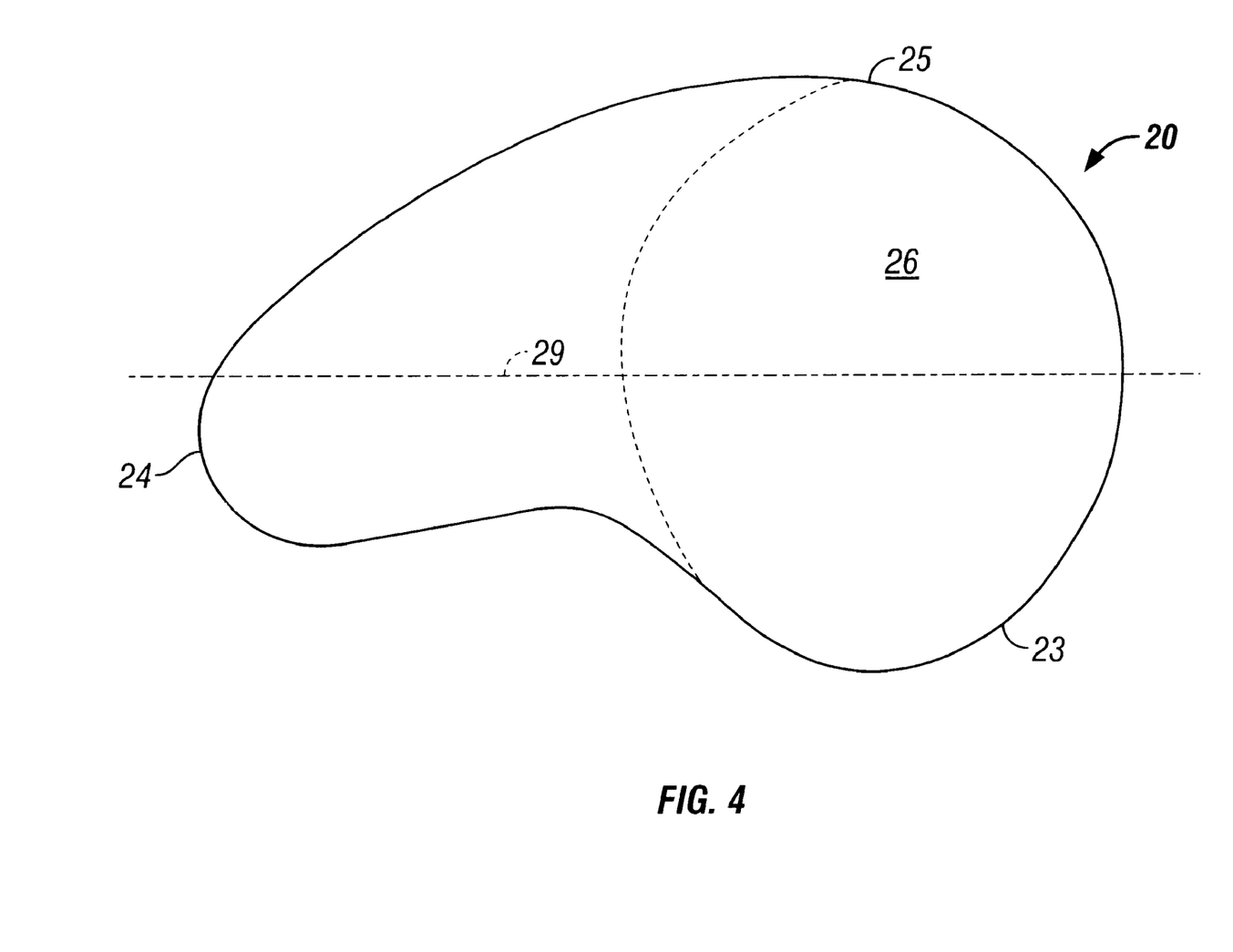
FIG. 4 is a close-up, plan view of one of the wings of the embodiment of FIG. 1, showing the geometric details thereof.

As can best be seen in FIGS. 1 & 4, each wing 20 is both longitudinally (left to right in FIGS. 1 & 4) and laterally extended (up to down in FIGS. 1 & 4), each Thy having at least one, curved lobe 23 forming a lateral extension, and with the tip 24 of the wing being flared forward (as viewed in FIG. 1) forming a smooth, continuous curve, with the back edge (as viewed in FIG. 1, actually the "leading" edge) 25 likewise forming a smooth, continuous curve. Thus, the combination of geometric curves produces a laterally extended, generally circularly area (note phantom lined circle 26 in FIGS. 1 & 4) to the front and back of each wing 20 at the wing portion proximal to the decoy body 10.

It should be understood that the wings 20 are concurrently rotated by the dual shaft motor 30 about the co-incident, center-line axes of their respective shafts 21/33, with the direction of rotation being, for example, counter-clock-wise, as viewed from the perspective of FIG. 2. It is noted that what is forward and what is a back edge as viewed in FIG. 1 will become the opposite, trailing and leading edges, respectively, after the wings 20 are rotated one hundred and eighty (180°) degrees. However, the direction of rotation could be just the opposite, if so desired, and is set up by the circuitry or wiring from the batteries 31 & 32 to the motor 30 and their grounding.

Thus, the wings 20, with their laterally extended, curved lobes 23, of a size of at least about nine (9") inches in "diameter," preferably are driven at a relatively high rotational speed of at least about six hundred (~600 rpm) revolutions per minute or greater, and at about an exemplary six hundred or about seven hundred and fifty (~600/750 rpm) revolutions per minute, by the motor 30. This is in contrast to, for example, the "FATAL DE DUCKTION" prior art having a rotational speed of only about four hundred (400 rpm) revolutions per minute and smaller wings with relatively straight leading or flat edges. These differences are not merely ones of degree but of kind, resulting in the present invention's "strobe" like effect, substantially adding to the attractive powers and greater visibility of the decoy 1 to flying ducks in comparison to the prior art.

The preferred embodiment also provides for a wing "flapping" like appearance effect. As can best be seen in FIG. 1, a series of adjacent but spaced holes 27A–C are formed in each of the wings 20, with the center one 27B being on the center-line 29 along with a substantially spaced distal hole 28. By "bolt/nut" attaching the proximal portion of the wing shaft 21 to a selected one of the holes 27A–C, with the distal portion of the wing shaft being "bolt/nut" connected to the distal hole 28, the apparent amount of the wing "flapping" effect can be varied. With the center, proximal hole 27B and the distal hole 28 defining the effective center-line 29 (note FIG. 4) of the wing 20, the alternatively selected, off-set holes 27A & 27C for the proximal portion of the wing shaft vary the amount of cant (note dashed straight lines in FIG. 1) of the respective wing's center-line 29 to the co-incident, in-line axis of rotation of the directly connected, motor drive shaft and the wing shaft. This in turn varies the amount of wing "flapping" effect, as selected by the decoy user.

Figure 5A:
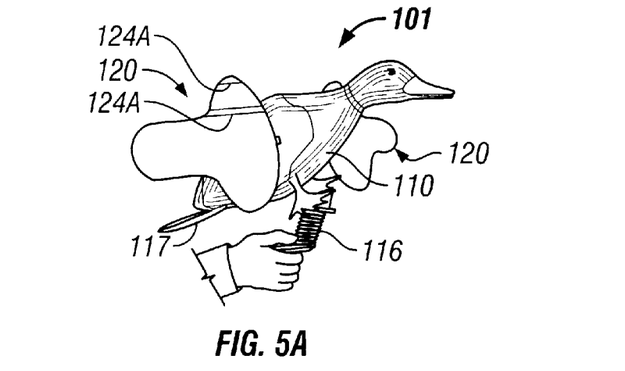
Figure 5B:
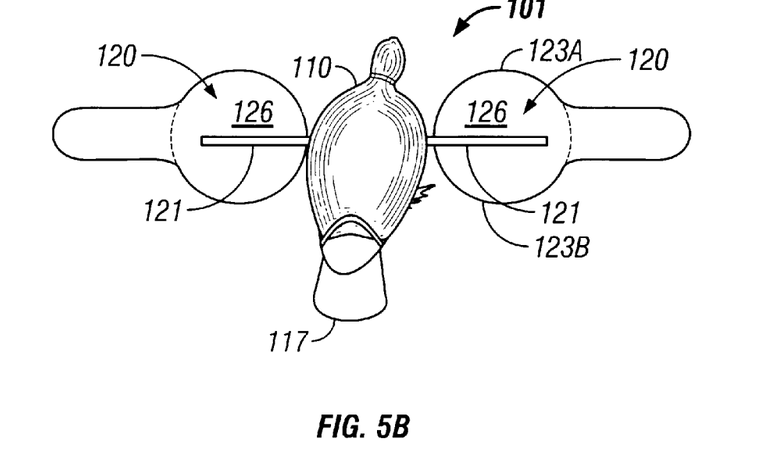
Figure 5C:
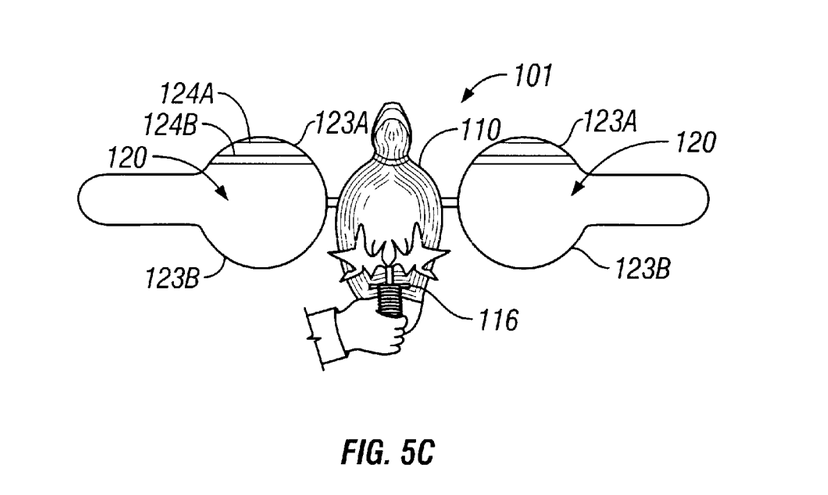

Referring now to FIGS. 5A, 5B & 5C, which are side-perspective, rear and front views, respectively, of a second, exemplary embodiment of the duck decoy of the present invention, a further exemplary wing design 120 is illustrated. As can be seen, each wing 120 includes a lobe 123A on its "trailing" edge, as well as a lobe 123B on its "leading" edge, there thus being laterally extended, curved lobes on both edges, conjunctively forming a laterally extended, circular area 26, likewise similar to the shape of a disc, in comparison to the single lobe 23 (FIG. 4) on the "trailing" edge of each wing 20 on the 1st embodiment.

The duck decoy 1/101, in use, can be mounted on a stand above the water, as known in the art, and a square tubing section 16 is included on the bottom of the decoy body 10 for interfacing with the tip of the standard stand. Alternatively, a spring clip/clamp device 116 (note FIG. 5A) can be provided for decoy mounting purposes. Additionally, as also seen in FIG. 5A, a decoy tail extension 117 (17, FIGS. 1 & 2) can be added to the standard decoy body (10) to "flappingly" strike the water, adding to the simulation arid ripple effects on the water created by the decoy 1/101 as the wings 20 rotated at high speed, causing the tail extension to vibrate in or slap the water.

It is noted that the embodiments of FIGS. 1–4 and FIGS. 5A–C are otherwise substantially the same, and for the sake of brevity the substantively identical details of the $2^{nd}$ embodiment will not be repeated here. However, analogous numbering is used between the two embodiments, with the reference numbering in the $1^{st}$ embodiment being incremented by a hundred in the $2^{nd}$ embodiment. Thus, for example, the body 10 of the $1^{st}$ embodiment is numbered 110 in the $2^{nd}$ embodiment.

It is also noted that the contrasting colors on the "underside" and the "upperside" of the flat wing 20/120 (namely, light/dark, e.g. white vs. olive green, respectively) of both embodiments are effectively seen in comparing FIGS. 5B & 5C. As can also be seen in FIGS. 5A & 5C, the darker "upperside" of each wing 120 preferably includes a pair of stripes 124A & 124B (also note 24A & 24B of FIG. 3A) at its "trailing" edge, longitudinally extended over or across the lobe 123A, better simulating the upperside of a real mallard's wing.

For further, exemplary detail, it is noted that the decoy body 10/120 can be based on, for example, an off-the-shelf decoy body from, for example, FLAM-BEAU® Products Corp. (Middlefield, Ohio 44062), using, for example, their model "5700 FB." The motor 30 can be, for example, an off-the-shelf, DC motor from, for example, MAMCO Corp. (8630 Industrial Drive, Frankville, Wis. 53126), using, for example, their model "BPM012A," with the wings 20 being cut from, for example, aluminum, having the configuration shown in detail in FIG. 4 or that of the wings 120 shown in FIGS. 5A–C, or another appropriate configuration. Exemplary dimensions and construction details are outlined below.

| | |
|---|---|
| Over-all wing span (Longitudinal extent of wings 20 + width of body 10) | 37" |
| Longitudinal extent of each wing 20 | 14 ¾" |
| Lateral extent of circular area 26 formed by lobe 23 and the opposite, curved leading edge | 9.67" |
| Material for wing shafts 21 | ⅝" aluminum shaft |
| Bottom connector 16 | ¾" tubing |

With reference to the exemplary flow chart of FIG. 6, the exemplary, preferred methodology of the "strobe" aspect of the system of the present invention includes the following steps:

(1) providing a decoy 11101 having a body 10/110 simulating the body of a water fowl with
rotatable wings 20/120 on either side of the body 10/110 with each wing having at least one, laterally extended lobe 23/123A–123B, and
at least a twelve (12 v) volt DC, direct drive, double shaft motor laterally disposed within the hollow interior 11/111 of the decoy body 10 directly connected to said wings 20/120, and providing the interior 11/111 with enclosed compartments for at least two, lantern type six (6 v) volt batteries connected in series; and (2) providing at least twelve (12 v) volts of DC power to said motor, rotating said wings 20/120 at a rate of rotation of at least about six hundred (~600 rpm) revolutions per minute, producing a "strobe" like effect.

Step "2" could include using either the internal, lantern type batteries 31 & 32 or a land based, marine or car type twelve (12 v) volt battery. In step "1" the curved lobes 23 could be on each wing's "trailing" edge or curved lobes 123A/123B could be provided on both the "leading" and "trailing" edges of each wing 120, which in either case produces a relatively wide, laterally extended, circular region.

It is noted that the embodiments described herein in detail for exemplary purposes are of course subject to many different variations in structure, size, design, application and methodology. Because many varying and different embodiments may be made within the scope of the inventive concepts herein taught, and because many modifications may be made in the embodiments herein detailed in accordance with the descriptive requirements of the law, it is to be understood that the details herein are to be interpreted as illustrative and not in a limiting sense.

What is claimed is:

1. A decoy, comprising:
    a basic body simulating in shape the body of a winged animal and having sides, a head and a tail and a hollow interior chamber therein;
    a pair of longitudinally extended, rotatable wings, said wings being substantially flat in their entirety and each having a terminating, distal wing tip opposed to that on the other wing, with one of said wings on one side of said body and the other of said wings on the other side of said body, said wings extending laterally out and away from said body, each terminating in a respective distal wing tip and devoid of any supporting restraint at said distal wing tip, each of said wings being directly attached to a separate wing shaft laterally disposed with respect to said body and extending along a longitudinal axis, said wing shafts not extending beyond said distal wing tips; and
    a double shaft, direct drive, DC, electric motor located in and mounted on said body in said hollow interior chamber and having two, opposed ends, each of said opposed ends having a centrally-located drive end shaft extending laterally out each end of said motor, wherein each of said drive end shafts is inserted directly into a respective said wing shaft and coupled thereto, wherein said motor provides common rotation together, said wings being solely supported off said basic body by their respective wing shafts coupled to their respective motor drive end shafts, said wings being devoid of any other connections to said body and being solely supported by said motor onto said body.

2. The decoy of claim 1, wherein:
    said motor directly rotatably drives said wings at a rotational rate of at least about six hundred (~600 rpm) revolutions per minute.

3. The decoy of claim 1, wherein:
    said motor directly rotatably drives said wings at a rotational rate in the range between at least about six hundred (~600 rpm) revolutions per minute up to a maximum of about nine hundred (~900 rpm) revolutions per minute.

4. The decoy of claim 1, wherein:
    said laterally extended wings each have on their undersides and their upper sides contrasting colors, which, when driven, produce a strobe effect.

5. The decoy of claim 1, wherein:
each of said drive end shafts protrudes a short distance beyond, and terminates in close juxtaposition to, the sides of said body.

6. The decoy of claim 1, wherein:
said wings are positioned at a non-co-incident angle with one another and with the center lines of said wing shafts, thereby creating a wing flapping appearance as said wings are rotated.

7. The decoy of claim 1, wherein there is further included:
a series of fasteners being the sole support for said motor in said body extending through the sides of said decoy body into the ends of said electric motor, suspending said electric motor within said chamber from side to side.

8. The decoy of claim 1, wherein said motor is twelve (12 v) or six (6 v) volt, DC motor.

9. The decoy of claim 1, wherein said motor is a twelve (12 v) or six (6 v) volt, DC motor, and where there is further included:
a land based, twelve (12 v) or six (6 v) volt battery for powering said motor.

10. The decoy of claim 1, wherein:
each of said wings has a leading edge and a trailing edge and a laterally extended, curved lobe on each wing's trailing edge.

11. The decoy of claim 10, wherein:
each of said wings has a laterally extended, curved lobe on each of said leading edge and said trailing edge.

12. The decoy of claim 1, wherein:
each of said wings has a curved leading edge and a curved trailing edge, and a curved lobe on at least its trailing edge forming with its opposite, leading edge a laterally extended, circular area, similar to a disc shape, each of said wings having contrasting colors on its opposing flat sides.

13. The decoy of claim 12, wherein:
said laterally extended, circular area of each wing has a diameter of at least about nine (9") inches.

14. The decoy of claim 1, wherein:
said wings are made of sheet material.

15. The decoy of claim 1, wherein:
said wings each have a center line and a series of adjacent, but spaced, off-set holes in them to which its respective wing shaft can be selectively attached by a mechanical connection, the center-lines of said wings capable of being positioned at an angle to one another and to the longitudinal axes of said wing shafts and said motor drive end shafts, creating a flapping appearance as said wings are rotated.

16. The decoy of claim 1, wherein:
a mechanical device holds each of said drive end shafts and said wing shafts together.

17. The decoy of claim 16, wherein:
said mechanical device holding each of said drive end shafts and said wing shafts together is a set screw.

18. The decoy of claim 1, wherein said decoy further comprises:
a tail extension, said tail extension connected to said tail and adapted to contact a water surface and cause ripples on said water surface in response to vibrations generated by the movement of said wings.

19. The decoy of claim 18, wherein said decoy further comprises:
a spring clamp, said spring clamp attached to said basic body and adapted to allow said decoy to be rockably attached to a mounting surface, wherein said spring clamp amplifies the movement of said tail extension generated by the movement of said wings and thereby increases the amount of said ripples on said water surface.

20. A decoy, comprising:
a basic body simulating in shape the body of a winged animal and having sides, a head, a tail and a hollow interior chamber therein;
a pair of longitudinally extended wings, one on either side of said body, extending laterally out from said body, each wing being substantially flat;
a pair of wing shafts connected, respectively, to said wings; and
a DC electric motor located in said chamber connected to said wing shafts to rotationally drive said wings via said wing shafts; said wings each having a center-line and a series of adjacent, off-set, spaced holes in them spaced away and off-set from its respective center-line, wherein said respective wing shafts can be selectively attached by a mechanical connection to said off-set holes, said center-lines of said wings thereby being positioned at an angle to one another and to the longitudinal axes of said wing shafts when said wing shafts are connected to said off-set holes, creating a flapping appearance as said wings are rotated by said motor.

21. The decoy of claim 20, wherein:
said off-set holes are located on both sides of said center-lines of said wings.

22. The decoy of claim 20, wherein:
said mechanical connection is a nut and bolt connection.

23. The decoy of claim 20, wherein:
there is at least one center-line hole located on said center-line of each of said wings, through which each of said wings is always attached to its respective wing shaft; and
said off-set holes are located closer to said decoy body than said center-line hole.

24. The decoy of claim 20, wherein:
said DC electric motor has opposed ends and is laterally disposed within said chamber, said motor having dual, in-line, centrally located, drive end shafts extending out said ends end of said motor, each of said wing shafts being directly connected to a respective one of said drive end shafts, there being an absence of any relatively moveable, intermediate mechanical structures between said drive shafts and said wing shafts during rotation, said wings being concurrently and directly rotated in-line by said motor through said wing shafts.

25. A method for enhancing the visibility of a decoy to wild game, comprising the following steps:
(1) providing a decoy having a basic body simulating the body of a winged animal having a hollow interior with a pair of longitudinally extended, rotatable wings, said wings being substantially flat in their entirety and each having a terminating, distal wing tip opposed to that on the other wing, with one of said wings on one side of said body and the other of said wings on the other side of said body, said wings extending laterally out and away from said body, each terminating in a respective distal wing tip and devoid of any supporting restraint at said distal wing tip, each of said wings being directly attached to a separate wing shaft laterally disposed with respect to said body and extending along a longitudinal axis, said wing shafts not extending beyond said distal wing tips; and a double shaft, direct drive, DC, electric motor located in and mounted on said body in said hollow interior chamber and having two, opposed ends, each of said opposed ends having a centrally-located drive end shaft extending laterally out each end of said motor, wherein each of said drive end shafts is inserted directly into a respective said wing shaft and coupled thereto, wherein said motor provides common rotation together, said wings being solely supported off said basic body by their respective wing shafts coupled to their respective motor drive end shafts, said wings being devoid of any other connections to said body and being solely supported by said motor onto said body; and (2) providing DC power to said motor and rotating said wings with said wing shafts, thereby producing a strobe effect.

26. The method of claim 25, wherein in the step of providing DC power there is included the step of:

rotating said wings at a rate of about six hundred (~600 rpm) to about nine hundred (~900 rpm) revolutions per minute.

27. The method of claim 25, wherein:

each of said wings has opposing sides, a curved leading edge, and a curved trailing edge, with a curved lobe on at least its trailing edge forming with its opposite, leading edge a laterally extended, circular area, similar to a disc shape, each of said wings having contrasting colors on said opposing sides; and said DC electric motor, while rotationally driving said wings at a high rate of speed in excess of about six hundred (~600 rpm)-revolutions per minute, produces with said laterally extended, circular areas of said wings and said contrasting colors a strobe effect.

* * * * *